United States Patent
Kim et al.

(10) Patent No.: US 9,487,105 B2
(45) Date of Patent: Nov. 8, 2016

(54) POWER SYSTEM FOR ELECTRIC VEHICLE AND CONTROL METHOD THEREOF

(71) Applicant: Hyundai Motor Company, Seoul (KR)

(72) Inventors: Yong Gi Kim, Whasung-Si (KR); Tal Chol Kim, Whasung-Si (KR); Ryong Choe, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 121 days.

(21) Appl. No.: 14/332,101

(22) Filed: Jul. 15, 2014

(65) Prior Publication Data

US 2015/0171774 A1   Jun. 18, 2015

(30) Foreign Application Priority Data

Dec. 16, 2013   (KR) .................. 10-2013-0156678

(51) Int. Cl.
| | |
|---|---|
| H02P 1/00 | (2006.01) |
| H02P 9/04 | (2006.01) |
| B60L 15/20 | (2006.01) |
| B60K 1/02 | (2006.01) |
| B60K 6/387 | (2007.10) |
| H02P 5/747 | (2006.01) |

(52) U.S. Cl.
CPC .............. B60L 15/20 (2013.01); B60K 1/02 (2013.01); B60K 6/387 (2013.01); H02P 5/747 (2013.01); Y02T 10/7258 (2013.01)

(58) Field of Classification Search
CPC .......... B60L 15/20; B60K 1/02; B60K 6/387
USPC ....................................... 318/139; 290/40 C
See application file for complete search history.

(56) References Cited

U.S. PATENT DOCUMENTS

| | | | | |
|---|---|---|---|---|
| 6,083,138 A | * | 7/2000 | Aoyama | ............. B60K 6/48 180/65.7 |
| 6,380,640 B1 | * | 4/2002 | Kanamori | ......... B60K 6/387 290/40 C |

FOREIGN PATENT DOCUMENTS

| | | | |
|---|---|---|---|
| JP | 2005-104215 A | 4/2005 | |
| JP | 2006-297553 A | 11/2006 | |

(Continued)

OTHER PUBLICATIONS

Izumi et al, Optimal Design of Gear Ratios and Offset for Energy Conservation of an Articulated Manipulator, Jul. 2009, IEEE, vol. 6. No. 3, pp. 551-557.*

*Primary Examiner* — Bentsu Ro
*Assistant Examiner* — Zemenay Truneh
(74) *Attorney, Agent, or Firm* — Morgan, Lewis & Bockius LLP

(57) ABSTRACT

Disclosed are a power system for an electric vehicle and a control method of a power system for an electric vehicle. The power system may include a first motor and a second motor configured as a power source, first and second reduction gears connected to the first and second motors and having different deceleration ratios, a driving shaft transmitting outputs of the first and second reduction gears, and a motor controller configured to determine a first driving point where the first motor responds according to a demand torque of a driver and a driving condition of the vehicle and a second driving point where the second motor responds according to the demand torque of the driver and the driving condition of the vehicle, and control driving by using at least one of an output torque of the first motor and/or an output torque of the second motor according to the determined driving point.

8 Claims, 3 Drawing Sheets

(56) References Cited

FOREIGN PATENT DOCUMENTS

| JP | 2008-247169 A | 10/2008 |
| JP | 2013-141862 A | 7/2013 |
| KR | 10-2009-0127493 A | 12/2009 |
| KR | 1020110008993 A | 1/2011 |
| KR | 1020120052559 A | 5/2012 |

* cited by examiner

POWER SYSTEM FOR ELECTRIC VEHICLE AND CONTROL METHOD THEREOF

CROSS-REFERENCE TO RELATED APPLICATION

The present application claims priority of Korean Patent Application Number 10-2013-0156678 filed on Dec. 16, 2013, the entire contents of which application are incorporated herein for all purposes by this reference.

BACKGROUND OF INVENTION

1. Field of Invention

The present invention relates to a power system for an electric vehicle and a control method thereof, and more particularly, to a power system for an electric vehicle and a control method thereof capable of securing required performance and improving performance by installing reduction gears having different deceleration ratios on two motors to connect the reduction gears on the same shaft and by selecting or combining first and second motors according to a driving demand torque.

2. Description of Related Art

The continuous demand of enhancement of fuel efficiency for a vehicle and the demand for an eco-friendly vehicle according to reinforcement of emission gas regulation in each country have been increased, and an electric vehicle has been provided as a realistic alternative thereto. The electric vehicle may narrowly mean only a pure electric vehicle, but includes a plug-in hybrid electric vehicle in the present invention.

The electric vehicle operates a driving motor by energy accumulated in a battery to provide driving, and collects the energy by regenerative braking during deceleration or stop to charge the battery.

Since the electric vehicle may not stably maintain a charging state of the battery by only the regenerative braking energy, a plug-in charging method in which the battery is charged by using commercial power after driving a predetermined distance or while the driving is completed is applied to the electric vehicle.

The electric vehicle generally applies a fixed end reduction gear to an output end of the driving motor.

Accordingly, in the electric vehicle, in order to satisfy required power performance, a large-capacity electric motor having high output equivalent to an engine output of a general vehicle on which an internal combustion engine is mounted is applied, and the electric vehicle needs to respond to a high torque demand for responding to starting and a low speed of the vehicle and a high rotation demand for securing a maximum speed of the vehicle.

The development of the electric motor for sufficiently satisfying various demands in various aspects is still difficult in terms of commercially, and as an attempt for compensating for the difficulty, application of the transmission has been discussed.

However, the demand for the high-output motor is not changed, and cost and energy loss largely occur due to transmission implementation, and utilization due to inevitable reduction of transmission quality is not definitively confirmed.

Further, since the high-output single motor has a high-efficiency area at a medium speed/medium load or more to satisfy maximum power performance of the vehicle, there is a problem in which inefficient driving is provided in a low speed/low load area which is a general driving condition.

Further, there are problems in that due to application of the transmission, a structure is complicated, reduction of the transmission quality is provided during high torque/high speed driving, and the power loss occurs in the transmission process.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a power system for an electric vehicle having advantages of providing output performance to satisfy a demand torque by installing reduction gears having different deceleration ratios on two motors to connect the reduction gears on the same shaft and by selecting or combining first and second motors according to a driving demand torque.

Further, the present invention has been made in an effort to provide a power system for an electric vehicle having advantages of reducing manufacturing cost, and optimizing power performance and power consumption of the vehicle by replacing a large-capacity driving motor with two small-capacity motors.

Various aspects of the present invention provide a power system for an electric vehicle, including: a first motor and a second motor configured as a power source; a first reduction gear connected to the first motor and a second reduction gear connected to the second motor; a driving shaft configured to transmit outputs of the first reduction gear and the second reduction gear; and a motor controller configured to determine a first driving point where the first motor responds according to a demand torque of a driver and a driving condition of the vehicle and a second driving point where the second motor responds according to the demand torque of the driver and the driving condition of the vehicle, and control driving by using at least one output torque of an output torque of the first motor and/or an output torque of the second motor according to the determined driving point.

The first reduction gear connected to the first motor and the second reduction gear connected to the second motor may have different deceleration ratios. A first driven gear may be formed in the first reduction gear, and a second driven gear may be formed in the second reduction gear, such that the first driven gear and the second driven gear may be connected to the driving shaft. The output torque of the first motor and the output torque of the second motor may be the same or different.

The motor controller may control driving by one single output torque of the output torque of the first motor or the output torque of the second motor according to the determined driving point, or control driving by a combined torque of the output torque of the first motor and the output torque of the second motor. The combined torque may be determined according to power consumption of the first motor and the second motor. The driving points may be determined based on a latticed table divided according to a wheel torque and a vehicle speed.

Various other aspects of the present invention provide a control method of a power system for an electric vehicle, including: determining a first driving point of a first motor according to a driving condition when a demand torque of a driver is detected; determining a second driving point of a second motor according to the first driving point; calculating an output torque of the first motor and an output torque of the second motor according to the first driving point and the second driving point; and controlling the first motor and the second motor according to the calculated output torques of the first motor and the second motor.

The control method may further include detecting the demand torque of the driver. The driving points may be determined based on a latticed table divided according to a wheel torque and a vehicle speed. The motors may be controlled to drive the vehicle using a single output torque of either the first motor or the second motor according to the first driving point and the second driving point, or controlled to drive the vehicle using a combined torque of the output torques of the first motor and the second motor according to the first driving point and the second driving point.

As such, according to various aspects of the present invention, a power system is configured by applying two low-priced small-capacity motors having low torque/low output/low speed characteristics instead of a high-priced large-capacity single motor having high torque/high output/ high speed characteristics in an electric vehicle, and as a result, cost is reduced to secure price competitiveness and the motors are properly combined according to a driving condition to secure high efficiency in all driving areas.

For example, during general speed driving, one small-capacity motor may be used, and during other special driving, powers of two motors are combined to achieve high-efficiency driving which is more efficient.

Further, in the present invention, a transmission is not applied and thus a sense of transmission difference does not occur, and power loss does not occur, thereby improving stability and reliability of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
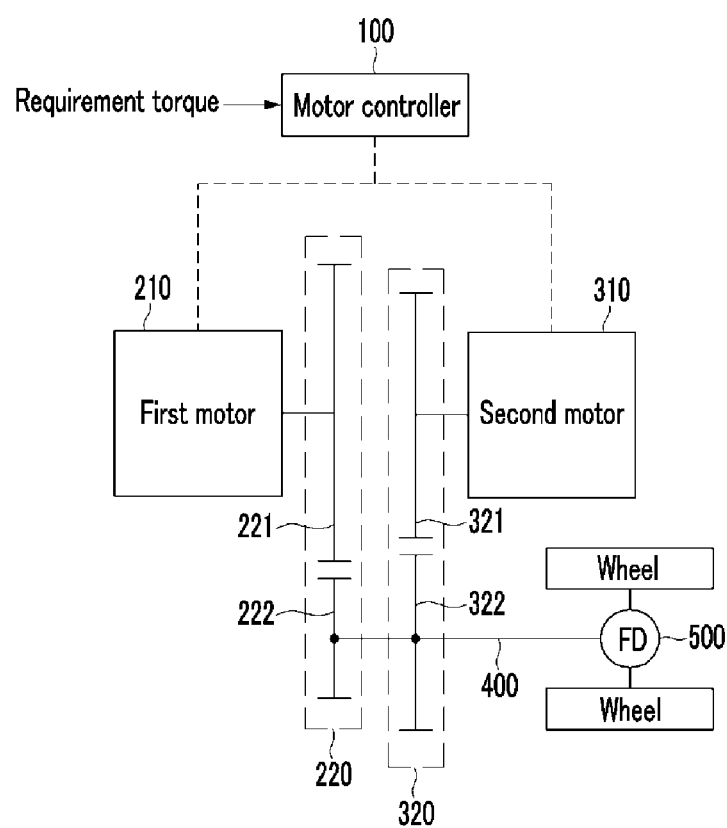
FIG. 1 is a block diagram schematically illustrating an exemplary power system for an electric vehicle according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Parts which are not associated with the description are omitted in order to specifically describe the present invention and like reference numerals refer to like elements throughout the specification. Further, in the drawings, the size and thickness of each element are illustrated for convenience of description, and the present invention is not necessarily limited to those illustrated in the drawings.

FIG. 1 is a block diagram schematically illustrating a power system for an electric vehicle according to various embodiments of the present invention. Referring to FIG. 1, the present invention includes a motor controller 100, a first motor 210, a first reduction gear 220, a second motor 310, a second reduction gear 320, and a driving shaft 400.

The motor controller 100 determines a high-efficiency first driving point where the first motor 210 connected with the first reduction gear 220 responds according to a driving condition by detecting a demand torque of a driver. Further, the motor controller 100 determines a high-efficiency second driving point where the second motor 310 connected with the second reduction gear 320 responds to the demand torque so as to output any one output torque of the first motor 210a and the second motor 310 to the driving shaft 400.

Further, the motor controller 100 outputs a combined torque of the first motor 210 and the second motor 310 to the driving shaft 400 according to the driving points where the first motor 210 and the second motor 310 respond to the demand torque.

The motor controller 100 may consider limit areas of the first motor 210 and the second motor 310 when the motor controller 100 determines the driving points where the first motor 210 and the second motor 310 respond according to the demand torque of the driver.

To this end, when the motor controller 100 determines the high-efficiency driving points where the first motor 210 and the second motor 310 respond, the motor controller 100 may derive the high-efficiency driving points from optimal high-efficiency driving point candidates in a latticed table which is divided according to a condition of a wheel torque of the vehicle and/or a vehicle speed.

Accordingly, the motor controller 100 determines the high-efficiency driving points where the first motor 210 and the second motor 310 respond among the driving point candidates, and may select a combination having minimum power consumption when the motor controller 100 derives the combined torque of the first motor 210 and the second motor 310.

Figure 2:
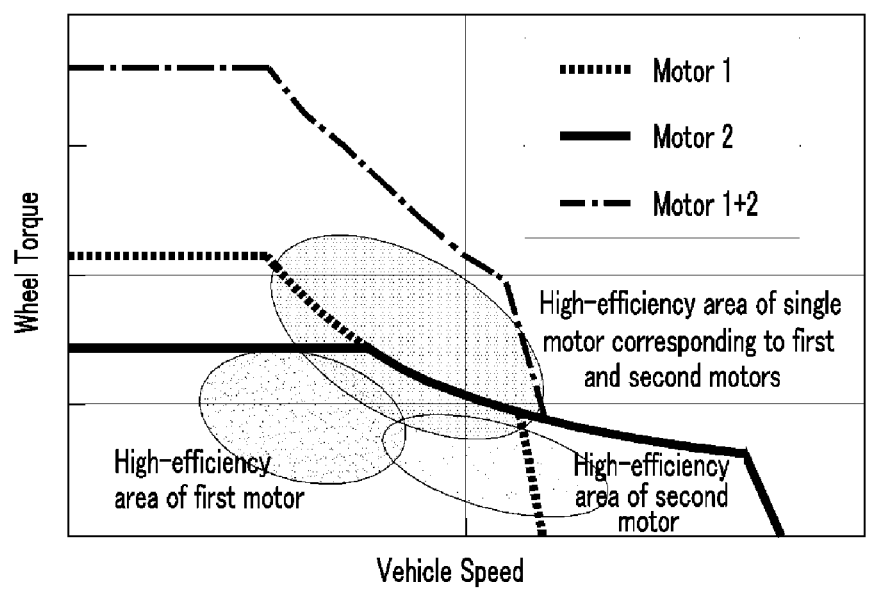
FIG. 2 is a graph illustrating a driving area of each motor in an exemplary power system for an electric vehicle according to the present invention.

FIG. 2 is a graph illustrating a driving area of each motor in a power system for an electric vehicle according to various embodiments of the present invention. Referring to FIG. 2, for example, when it is assumed that high-efficiency driving points determined by the first motor 210, the second motor 310, and the combination of the first motor 210 and the second motor 310 are the same as those as illustrated in FIG. 2, the motor controller 100 responds to a general driving condition such as urban driving by using the high-efficiency driving point of only the first motor 210 to minimize power consumption.

On the other hand, in the driving points of FIG. 2, the motor controller 100 may respond to a high-speed driving condition by using the high-efficiency driving point of only the second motor 210 in the high-speed driving condition of the vehicle.

Further, in the driving points of FIG. 2, the motor controller 100 may respond to the driving condition by a sum of output torques of the first motor 210 and the second motor 310 when the vehicle is under a driving condition requiring a maximum torque such as deployment acceleration.

In addition, in a driving period when the first motor 210 and the second motor 310 are combinable, when the first motor 210 or the second motor 310 responds to the demand torque of the driver by a combined torque of the first motor 210 and the second motor 310 rather than a single output torque of the first motor 210 or the second motor 310, the efficiency may be additionally improved, the motor controller 100 may use the properly combined torque of the first motor 210 and the second motor 310.

For this end, the motor controller 100 may be implemented by one or more processors operating by a set program, and the set program may be programmed so as to perform each step of the control method of the power system for the electric vehicle according to various embodiments of the present invention.

The first motor 210 and the second motor 310 may be adapted to include small-capacity motors having the same output torque or different output torques. The first motor 210 is adapted to include, for example, a motor having a high-efficiency driving point in medium speed/medium torque as illustrated in FIG. 2 to respond to general driving such as urban driving. The second motor 310 is adapted to include, for example, a motor having a high-efficiency driving point in high speed/low torque as illustrated in FIG. 2 to respond to high-speed driving.

The first reduction gear 220 is mounted on an output shaft of the first motor 210, and a first driving gear 221 and a first driven gear 222 configuring the first reduction gear 220 engage with each other at a predetermined deceleration ratio to determine the high-efficiency first driving point of the first motor 210.

The second reduction gear 320 is mounted on an output shaft of the second motor 310, and a second driving gear 321 and a second driven gear 322 configuring the second reduction gear 320 engage with each other at a predetermined deceleration ratio to determine the high-efficiency second driving point of the second motor 310.

The driving shaft 400 connects the first driven gear 222 of the first reduction gear 210 and the second driven gear 322 of the second reduction gear 320 by one output shaft. Accordingly, the driving shaft 400 transfers the output of the first reduction gear 210 or the output of the second reduction gear 320 to a driven gear 500, or transfers a combination of the outputs of the first reduction gear 210 and the second reduction gear 320 to the driven gear 500 as one output. Therefore, the driving torque is transferred to left and right wheels through the driven gear 500 to provide driving of the electric vehicle.

Hereinafter, a control method of a power system for an electric vehicle according to various embodiments of the present invention will be described in detail with reference to FIG. 3.

Figure 3:
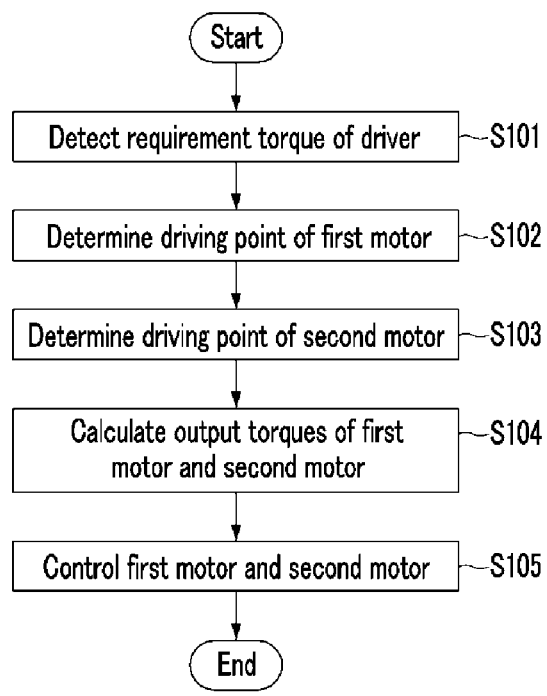
FIG. 3 is a flowchart illustrating an exemplary control method of a power system for an electric vehicle according to the present invention.

FIG. 3 is a flowchart illustrating a control method of a power system for an electric vehicle according to various embodiments of the present invention. The control method of a power system for an electric vehicle according to various embodiments of the present invention starts by detecting a demand torque of the driver by the motor controller 100 (S101).

When the demand torque of the driver is detected, the motor controller 100 determines, according to a driving condition of the vehicle, a high-efficiency first driving point where the first motor 210 responds to the driving condition (S102). In addition, the motor controller 100 determines a high-efficiency second driving point where to the second motor 310 responds to the driving condition according to the high-efficiency first driving point (S103).

In the high-efficiency driving points where the first motor 210 and the second motor 310 respond to the driving condition, different deceleration ratios of the first reduction gear 220 and the second reduction gear 320 connected to each output shaft are considered. Accordingly, the high-efficiency driving points where the first motor 210 and the second motor 310 respond to the driving condition are determined by applying the deceleration ratios of the first reduction gear 220 connected to the driving shaft of the first motor 201 and the reduction gear 320 connected to the driving shaft of the second motor 310.

Further, when the motor controller 100 determines the high-efficiency driving points where the first motor 210 and the second motor 310 respond to the demand torque according to the demand torque of the driver, the motor controller 100 may consider limit areas of the first motor 210 and the second motor 310. Accordingly, the high-efficiency driving points where the first motor 210 and the second motor 310 respond to the demand torque may be derived from optimal high-efficiency driving point candidates in a latticed table which is divided into plural tables according to a condition of a wheel torque of the vehicle and a vehicle speed.

In steps S102 and S103, when the driving point of the first motor and the driving point of the second motor are determined, the motor controller 100 calculates the output torque of the first motor 210 and the output torque of the second motor 310 according to the driving points (S104). In this case, the motor controller 100 may select a combination of the output torque of the first motor 210 and the output torque of the second motor 310 satisfying the demand torque of the driver having minimum power consumption.

Referring back to FIG. 2 described above, for example, when it is assumed that the high-efficiency driving points determined by the first motor 210, the second motor 310, and the combination of the first motor and the second motor are the same as those illustrated in FIG. 2, the driving may be provided by only the first motor 210 having medium speed/medium torque driving point in an urban driving condition.

On the other hand, in the driving point of FIG. 2, in the high-speed driving condition, the driving may be provided by only the second motor 210 having a high speed/low load driving area.

As such, when the driving is provided by the driving of only the first motor 201 or the driving of only the second motor 320, an output torque of an undriven motor may be determined as 0. That is, under the driving condition such as urban driving, the output torque of the second motor 320 may be 0, and under the driving condition such as high-speed driving, the output torque of the first motor 210 may be 0.

In some cases, at the driving point of FIG. 2, under a driving condition requiring a maximum torque such as deployment acceleration, the motor controller 100 may respond to the driving condition by a sum of output torques of the first motor 210 and the second motor 310.

In order to satisfy the demand torque of the driver, when responding to the driving condition by the combined torque of the first motor 210 and the second motor 310 as compared with responding to the driving condition by a single output torque of the first motor 210 or the second motor 310, since the efficiency may be additionally improved, the motor controller 100 may use the demand torque by properly combining the output torque of the first motor 210 and the output torque of the second motor 310.

Accordingly, the outputs of the first motor 210 and the second motor 310 are transferred to the driven gear 500 through the driving shaft 400 connected to the first driven gear 222 of the first reduction gear 220 and the second driven gear 322 of the second reduction gear 320 by one shaft to transfer power to the left and right wheels.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power system for an electric vehicle, comprising:
   a first motor and a second motor configured as a power source;
   a first reduction gear connected to the first motor and a second reduction gear connected to the second motor;
   a driving shaft continuously connected to the first motor through the first reduction gear, continuously connected to the second motor though the second reduction gear, and configured to transmit outputs of the first reduction gear and the second reduction gear; and
   a motor controller configured to determine first driving point candidates where the first motor responds according to a demand torque of a driver and a driving condition of the vehicle, determine second driving point candidates where the second motor responds according to the first driving point candidates, determine a high-efficiency first driving point where the first motor responds and a high-efficiency second driving point where the second motor responds in which power consumption of the first motor and the second motor is minimum among the driving point candidates, determine an output torque of the first motor and an output torque of the second motor based on the high-efficiency driving point and the high-efficiency of the second driving point, and control driving of the first motor and the second motor based on the output torque of the first motor and the output torque of the second motor.

2. The power system of claim 1, wherein the first reduction gear connected to the first motor and the second reduction gear connected to the second motor have different deceleration ratios.

3. The power system of claim 1, wherein a first driven gear is formed in the first reduction gear and a second driven gear is formed in the second reduction gear such that the first driven gear and the second driven gear are connected to the driving shaft.

4. The power system of claim 1, wherein the output torque of the first motor and the output torque of the second motor are the same or different.

5. The power system of claim 1, wherein the motor controller controls driving by a single output torque of either the output torque of the first motor or the output torque of the second motor according to the determined driving point.

6. The power system of claim 1, wherein the motor controller controls driving by a combined torque of the output torque of the first motor and the output torque of the second motor according to the determined driving point.

7. The power system of claim 6, wherein the combined torque is determined according to power consumption of the first motor and the second motor.

8. The power system of claim 1, wherein the driving points are determined based on a latticed table divided according to a wheel torque and a vehicle speed.

* * * * *